May 22, 1956 J. R. WELLS 2,746,355
INSIDE ADJUSTABLE REARVIEW MIRROR FOR AUTOMOBILES
Filed Nov. 10, 1952 2 Sheets-Sheet 1
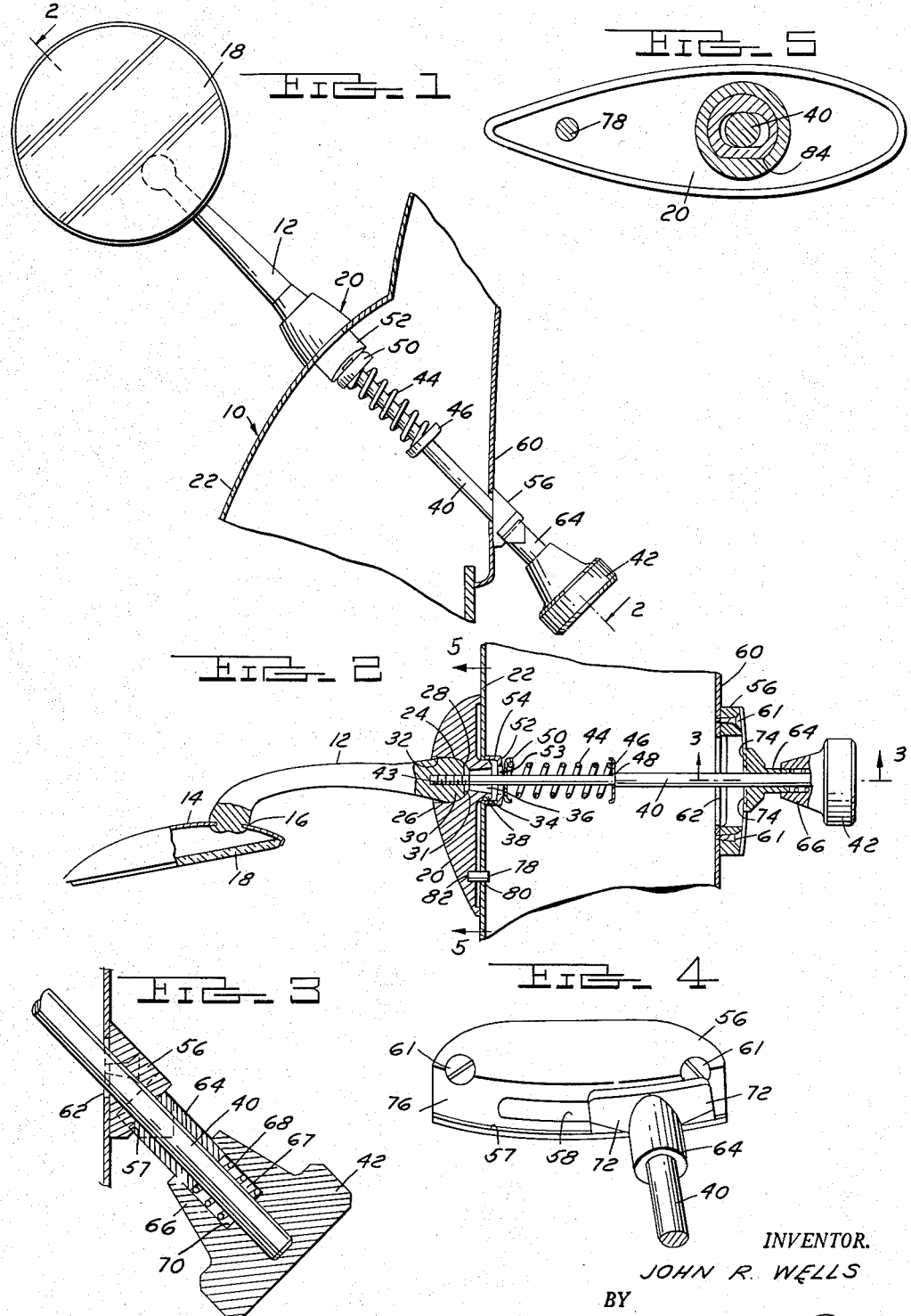
INVENTOR.
JOHN R. WELLS
BY
Whittemore, Hulbert & Belknap
ATTORNEYS

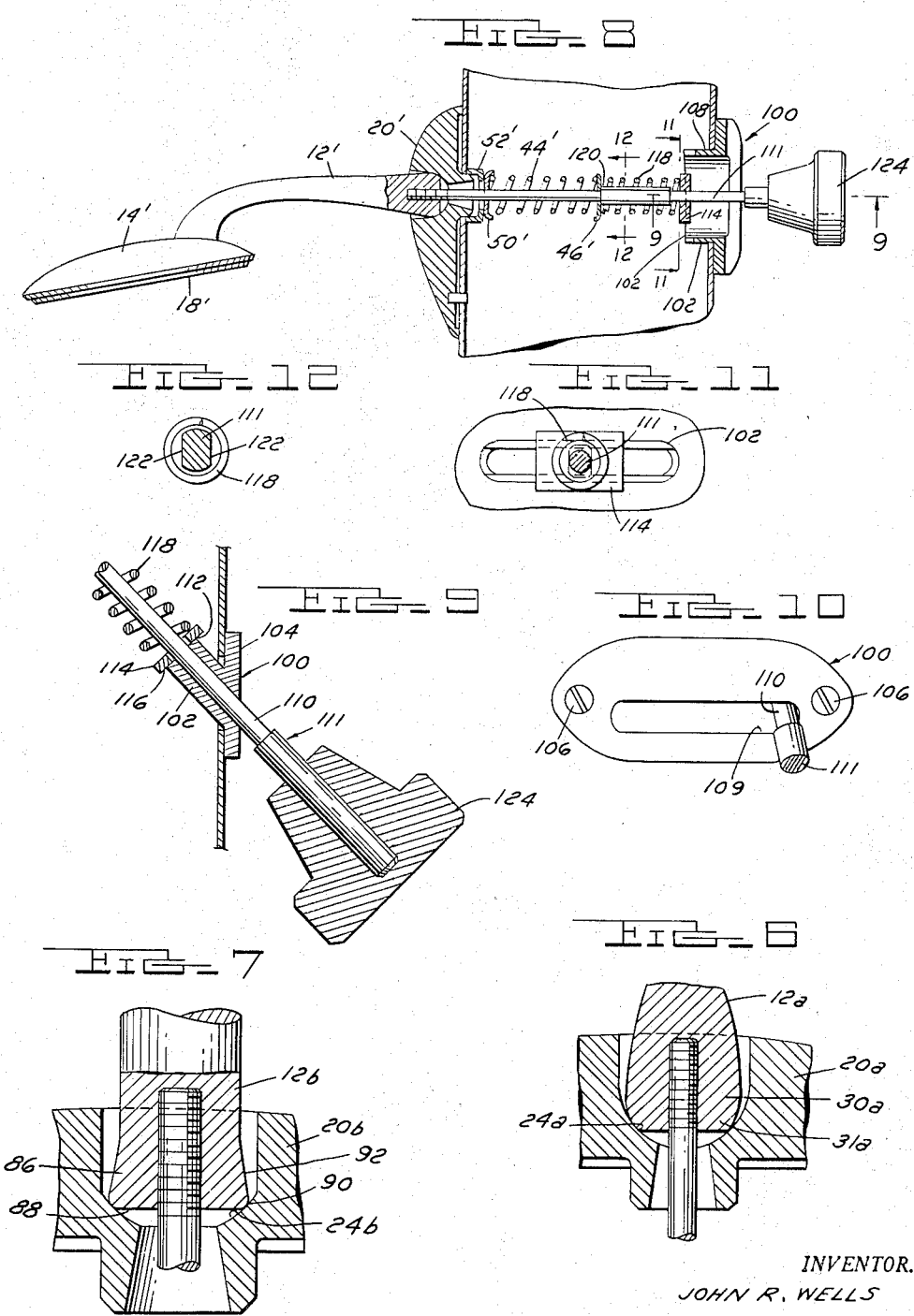

United States Patent Office 2,746,355
Patented May 22, 1956

2,746,355

INSIDE ADJUSTABLE REARVIEW MIRROR FOR AUTOMOBILES

John R. Wells, Detroit, Mich.

Application November 10, 1952, Serial No. 319,671

9 Claims. (Cl. 88—93)

This invention relates to adjustable rear-view mirrors for automobiles, and more particularly, one which is adapted to be disposed on the outer side of an automobile door.

One object of this invention is to provide a rear-view mirror for automobiles which is universally adjustable within a limited range and having provision within the automobile for accomplishing the adjustment of the mirror.

A further object of the invention is to provide novel means for frictionally retaining the mirror at the desired setting to prevent the same from accidentally getting out of adjustment during movement of the car.

In the ordinary ball and socket mounting for an adjustable rear-view mirror, it is often difficult to provide the necessary friction for maintaining the desired setting of the mirror under ordinary driving conditions. Accordingly, it is a feature of the present invention to provide a ball having a flattened side, the ball having a radius of curvature somewhat less than that of the socket, whereby the marginal edge of the flattened side will be wedged slightly in the socket to increase the frictional contact therebetween.

A further object of the invention is to provide a socket block for supporting the mirror holding arm having novel simplified means for maintaining the same fixed to the outer door panel.

The foregoing and other objects will become more apparent as the following description proceeds, especially when taken in connection with the accompanying drawings, wherein:

Figure 1 is a vertical sectional view through an automobile door panel showing in elevation a rearview mirror assembly embodying the present invention.

Figure 2 is a sectional view taken along the line 2—2 on Figure 1;

Figure 3 is a sectional view taken along the line 3—3, Figure 2;

Figure 4 is an elevational view of the portions of the device projecting inside the automobile, the knob having been removed;

Figure 5 is a sectional view taken along the line 5—5, Figure 2 with the outer panel broken away;

Figure 6 is a sectional view of a modified ball and socket mounting for the mirror assembly of Figure 1, the relationship between the ball and socket being exaggerated for purposes of clarity;

Figure 7 is a sectional view of another modification of swivel mounting for the mirror;

Figure 8 is a view similar to Figure 2 but showing still another form of the invention;

Figure 9 is a sectional view taken along the line 9—9, Figure 8.

Figure 10 is an elevational view, similar to Figure 4, of the portions of the device shown in Figures 8 and 9 disposed within the automobile.

Figures 11 and 12 are sectional views respectively taken along the lines 11—11 and 12—12 on Figure 8.

Referring now more particularly to the drawings and especially to Figures 1 and 2 thereof, the mirror assembly will be seen to be mounted on one of the vehicle doors 10, ordinarily the one adjacent to the driver's seat. The mirror assembly comprises a mirror-supporting arm 12 on the outer side of the door, having a mirror frame 14 rigidly secured to the outer end of the arm as indicated at 16, said frame rigidly supporting a mirror 18 therein. It will thus be seen that the mirror 18 is fixedly positioned with respect to the arm 12. It will, of course, be understood that the mirror and frame may be otherwise secured to arm 12, if desired, as by a swivel connection.

A socket block 20 is provided for supporting the arm 12 for limited swivel movement, being rigidly secured, for example, on the outer side of the outer door panel 22 in a manner hereinafter more fully described. The socket block is formed with a socket 24 which is open at the top or outer side 26 of the socket block to receive the inner end of the arm 12. The bottom portion 28 of the socket is spherically-shaped to receive the similarly shaped end portion 30 of the arm 12, thereby providing for full rotative movement of the arm and rocking movement within a limited range determined by the size of the mouth 32 of the socket. It is not necessary that the end portion 30 be a complete sphere to permit the above described movement but may be flattened on one side as at 31.

The socket block 20 is formed with a cylindrical boss 34 on the inner side thereof which has a passage 36 therein opening into the bottom of socket 24. The boss 34 projects through an aperture 38 in the outer door panel 22.

The position of the mirror-supporting arm 12 relative to socket block 20 is controlled by suitable mechanism accessible within the automobile. This mechanism includes a rod 40 one end of which threadedly engages the ball-shaped end portion 30 of arm 12 and extends from that point through passage 36 terminating at a position within the automobile, as seen in Figure 3. The rod 40 has a control knob 42 secured on the inner end thereof as by a press fit. The threaded connection 43 between the outer end of rod 40 and the ball-shaped end portion of arm 12 is tightened to such a degree as to prevent loosening thereof which might otherwise result from the twisting action imposed by the operation of control knob 42. Obviously, means other than the threaded connection shown at 43 may be provided to effect the connection between arm 12 and rod 40.

Provision is made for drawing the ball-shaped portion 30 into rather tight frictional engagement with socket 24 in order to maintain the setting of arm 12 in position with the mirror 18 at the desired angle. This is accomplished by providing a spring 44 encircling rod 40, one end of which bears against an annular cup 46 which is slidable on rod 40 and bears against a shoulder 48 thereon. The other end of the spring bears against annular cup 50 which is seated against a pressure cap 52. The flange portion 54 of pressure cap 52 bears against the outer door panel 22 along the marginal portion thereof bordering opening 38. The inner end of boss 34 on socket block 20 will be seen to be received in pressure cap 52, and the latter has a slot 53 to accommodate rod 40. The head of cap 52 is curved on a radius substantially coinciding with the axis of rocking movement of arm 12.

While spring 44 operates to prevent both rotative and rocking movement of the arm 12 in socket 24, it has been found in practice that said spring is much more effective in resisting rotative movement of the arm. To resist rocking movement of arm 12, a second spring 68 is provided.

A guide block 56 is formed with a slot 58 through which the inner end of rod 40 extends, said slot being elongated to determine the extent of rocking movement permitted of arm 12 and is of a width approximating the diameter of rod 40 to confine the path of rocking movement. The passage in boss 34 is flared slightly to permit this rocking movement. Guide block 56 may be secured to the inner side of the inner door panel, more specifically window frame 60 as by screws 61, the frame 60 having a slot 62 registering with slot 58 for the reception of rod 40.

Referring now to Figures 2 and 3, a sliding member 64 is sleeved on rod 40 between knob 42 and guide block 56. Knob 42 is formed with a tubular extension 66, the inner surface of which is spaced from rod 40 to define an annular space 67 therebetween. A compression spring 68 is disposed in annular space 67, one end of which bears against shoulder 70 at the end of the annular space and the other end of which bears against the adjacent end of the sliding member 64 received in the outer end of tubular extension 66. The opposite end of member 64 is formed with a pair of laterally extending flanges 72 which have arcuate faces 74 engageable with the similarly formed face 76 on guide block 56. It will be noted that face 76 is curved on a radius whose center coincides with the axis of rocking movement of arm 12, and that the guide block 56 has a lip 57 engaging flanges 72 of sliding member 64 during rocking of arm 12. The member 64 is thus urged away from knob 42 by the action of spring 68 causing faces 74 of tubular member 64 to engage the arcuate face 76 and thereby frictionally resist rocking movement of the mirror assembly relative to the guide block.

Thus, in addition to the action of spring 44, spring 68 and tubular member 64 serve to resist accidental rocking movement of the mirror assembly. It might be noted that spring 68 also serves to a limited extent to resist rotation of the arm 12 by tending to draw the ball 30 into the socket.

As best seen in Figure 2, the socket block 20 is held against the outer side of door panel 22, with boss 34 projecting through the hole 38 in the outer door panel, by the action of spring 44 and also by the action of spring 68 as these springs tend to draw the ball portion 30 of arm 12 tightly into the socket 34 of the socket block. A pin 78 extends through a hole 80 in panel 22 and is secured in a recess 82 in the socket block to prevent turning movement of the latter relative to the door panel 22. Thus, no other means are required to mount the socket block on the door panel.

Referring to Figure 5, the overlapping portions of cap 52 and boss 34 will be seen to be non-circular in cross-section having complementary flattened sides 84 preventing relative rotation therebetween.

Another form of the ball and socket connection is shown in Figure 6. The socket block 20a there shown may be like that of Figure 2 in every detail. However, the ball-shaped end portion 30a of arm 12a is formed to a radius of curvature somewhat less than that of socket 24a. This relationship between the portion 30a and socket 24a is exaggerated in the interest of clarity. Accordingly, ball 30a engages the socket in substantial line contact along the circular peripheral edge of the flattened side 31a. Thus, by employing a ball having a radius of curvature somewhat less than that of the socket and having a flattened side, the action of spring 44 tending to seat the ball in the socket produces a wedging action between the socket and the circular peripheral edge of the flattened side so as to increase the resistance to relative movement between the arm and socket block. In other respects the mirror assembly may be like those of Figures 2 and 8.

Still another form of the invention is illustrated in Figure 7 wherein the socket block 20b is formed with a spherically-shaped socket 24b generally similar to that shown in Figure 2. The arm 12b for supporting the mirror is somewhat different however, in that the portion received in the socket is not spherically-shaped but constitutes a slight enlargement 86 which is flattened on the end 88, the rounded margin 90 at the junction of end 88 and sides 92 of the enlargement seating in the socket. Otherwise, the mirror assembly may be similar to those shown in Figures 2 and 8.

Figures 8 to 11 illustrate still another form of the invention. The mirror assembly therein illustrated differs from that of Figure 2 primarily in the means provided for preventing rocking movement of the mirror-supporting arm. The remaining parts are like the corresponding parts of Figure 2 and are given like numerals which are primed.

Guide block 100 comprises a flattened tubular portion 102 which has a flange 104 detachably connected to the window frame by screws 106. When thus mounted, the portion 102 projects through an opening 108 in the window frame. Said tubular portion defines an elongated slot 109 having a width approximately the diameter of the reduced portion 110 of rod 111 and the length of the slot determines the extent of rocking movement permitted of the mirror assembly. The outer end 112 of tubular portion 102 is arcuate, being formed on a radius having a center coinciding with the axis of rocking movement of the mirror-supporting arm. A sliding member 114 is sleeved on rod 111 having a surface 116 corresponding in shape to that of the arcuate end 112 of the tubular portion, said annular member being pressed into frictional engagement with the end 112 by a compression spring 118 encircling the rod and interposed between the sliding member and the cup 46'. Spring 118 is of less strength than spring 44' to assure that cup 46' will at all times be pressed against shoulder 120 on rod 111 to urge the ball and socket into tight frictional engagement.

Figure 12 illustrates the cross-sectional shape of the portion of rod 111 surrounded by spring 118, being flattened on opposite sides 122 to permit the rod to be inserted through passage 108 of the guide block for assembly.

A knob 124 is secured on the inner end of rod 111 with a press fit to enable rotating and rocking the mirror assembly.

While the mirror assembly thus described has been shown in connection with a vehicle body door, it will be understood that this is by way of illustration only, and that the mirror assembly may be mounted at almost any location on a vehicle, and in fact is applicable to any structure requiring a device of this class.

The drawings and the foregoing specification constitute a description of my invention in such full, clear, concise and exact terms as to enable any person skilled in the art to practice the invention, the scope of which is indicated by the appended claims.

What I claim as my invention is:

1. The combination with a vehicle body wall having spaced inner and outer panels, of a mounting including an arm for supporting a mirror or the like, means on said outer panel having a supporting portion for said arm, said arm and supporting portion having a socket on the one and a part on the other received in said socket to provide a swivel connection permitting rotation and rocking movement of said arm relative to said supporting portion, said arm having an extension projecting through a passage in said supporting portion and through said inner and outer panels, said inner and outer panels having openings for accommodating said extension, a guide block secured to said inner panel having an elongated slot receiving said extension to closely confine the path of rocking movement of said extension and arm, means providing an abutment adjacent and fixed relative to said supporting portion, means for urging said part against said socket to frictionally resist movement of said arm relative to said supporting portion including spring means on said extension between said supporting portion and guide block and supported on said extension against movement lengthwise thereof in an inward direction, said spring means having a portion acting upon and applying a yielding pressure against said abutment in an outward direction.

2. The combination with a vehicle body wall having spaced inner and outer panels, of a mounting including an arm for supporting a mirror or the like, means on said outer panel having a supporting portion for said arm, said arm and supporting portion having a socket on the one and a part on the other received in said socket to provide a swivel connection permitting rotation and rocking movement of said arm relative to said supporting portion, said arm having an extension projecting through a passage in said supporting portion and through said inner and outer panels, said inner and outer panels having openings for accommodating said extension, a guide block secured to said inner panel and engaging said extension to closely confine the path of rocking movement of said extension and arm, means providing an abutment adjacent and fixed relative to said supporting portion, means for urging said part against said socket to frictionally resist movement of said arm relative to said supporting portion including spring means on said extension between said supporting portion and guide block and supported on said extension against movement lengthwise thereof in an inward direction, said spring means having a portion acting upon and applying a yielding pressure against said abutment in an outward direction, means for resisting rocking movement of said arm relative to said supporting portion including an element slidably supported on said extension adjacent said guide block, spring means supported on said extension and having a portion acting upon and imposing a yielding pressure against said element urging the latter into frictional contact with said guide block, said second-mentioned spring means being supported on said extension against movement lengthwise thereof in a direction away from said element.

3. The combination with a vehicle body wall having spaced inner and outer panels, of a mounting including an arm for supporting a mirror or the like, means on said outer panel having a supporting portion for said arm, said arm and supporting portion having a socket on the one and a part on the other received in said socket to provide a swivel connection permitting rotation and rocking movement of said arm relative to said supporting portion, said arm having an extension projecting through a passage in said supporting portion and through said inner and outer panels, said inner and outer panels having openings for accommodating said extension, a guide block secured to said inner panel and engaging said extension to closely confine the path of rocking movement of said extension and arm, means providing an abutment adjacent and fixed relative to said supporting portion, means for urging said part against said socket to frictionally resist movement of said arm relative to said supporting portion including spring means on said extension between said supporting portion and guide block and supported on said extension against movement lengthwise thereof in an inward direction, said spring means having a portion acting upon and applying a yielding pressure against said abutment in an outward direction, means for resisting rocking movement of said arm relative to said supporting portion including an element slidably supported on said extension adjacent said guide block, a compression coil spring encircling said extension and having one end acting upon and applying a yielding pressure against said element urging the latter into frictional contact with said guide block, and means on said extension providing an abutment for the other end of said spring to hold the latter under compression.

4. The combination defined in claim 3 in which said element and said coil spring are located between said spring means and said guide block.

5. The combination defined in claim 3 in which said element and said coil spring are located at the side of said guide block away from said outer panel, and an operating knob on the end of said extension at the aforesaid side of said guide block providing the abutment for the said other end of said coil spring.

6. The combination with a vehicle body wall having spaced inner and outer panels, of a mounting including an arm for supporting a mirror or the like, means on said outer panel having a supporting portion for said arm, said arm and supporting portion having a socket on the one and a part on the other received in said socket to provide a swivel connection permitting rotation and rocking movement of said arm relative to said supporting portion, said arm having an extension projecting through a passage in said supporting portion and through said inner and outer panels, said inner and outer panels having openings for accommodating said extension, a guide block secured to said inner panel and engaging said extension to closely confine the path of rocking movement of said extension and arm, means providing an abutment adjacent and fixed relative to said supporting portion, means for urging said part against said socket to frictionally resist movement of said arm relative to said supporting portion including a compression coil spring encircling said extension between said supporting portion and said guide block and having one end acting upon and applying a yielding pressure against said abutment, means for resisting rocking movement of said arm relative to said supporting portion including an element slidably supported on said extension adjacent said guide block, a compression coil spring encircling said extension and having one end acting upon and applying a yielding pressure against said element urging the latter into frictional contact with said guide block, and means on said extension providing abutment means for the other ends of said springs to hold the latter under compression.

7. The combination defined in claim 6 in which said element and said second-mentioned spring are located between said first-mentioned spring and said guide block.

8. The combination defined in claim 6 in which said element and said second-mentioned spring are located at the side of said guide block away from said outer panel, and an operating knob on the end of said extension at the aforesaid side of said guide block providing the abutment means for the said other end of said second-mentioned spring.

9. The combination with a vehicle body wall panel, of a mounting including an elongated member for supporting a mirror or the like, a mounting block member for said supporting member on the outer side of said panel, a socket on one of said members and a part on the other received in said socket and providing a swivel connection between said members, an extension on said supporting member extending through said block member and said panel beyond the inner side of the latter, resilient means interposed between said panel and said extension and yieldably urging the latter inwardly in the direction of its length to press said part into said socket and to press said block member against said panel, said panel having spaced openings therein, and said block member having parts projecting inwardly from the inner surface thereof slidably received in said respective openings.

References Cited in the file of this patent

UNITED STATES PATENTS

| | | |
|---|---|---|
| 1,390,350 | Evans | Sept. 13, 1921 |
| 1,492,682 | Foster | May 6, 1924 |
| 1,494,821 | Stearns | May 20, 1924 |
| 1,514,133 | Courson | Nov. 4, 1924 |
| 1,612,960 | Anderson | Jan. 4, 1927 |
| 1,681,026 | Bradnack | Aug. 14, 1928 |
| 1,684,695 | Draper | Sept. 18, 1928 |
| 1,869,984 | Sklarek | Aug. 2, 1932 |
| 2,041,847 | Marchand | May 26, 1936 |
| 2,136,836 | Bernard | Nov. 15, 1938 |
| 2,483,289 | Martin | Sept. 27, 1949 |
| 2,540,257 | Gross | Feb. 6, 1951 |
| 2,594,784 | Mead | Apr. 29, 1952 |
| 2,620,708 | Anderson | Dec. 9, 1952 |
| 2,623,986 | Falge | Dec. 30, 1952 |
| 2,632,363 | Persson | Mar. 24, 1953 |
| 2,634,364 | Sklarek | Apr. 7, 1953 |
| 2,644,363 | Capitani | July 7, 1953 |